Figure 1:
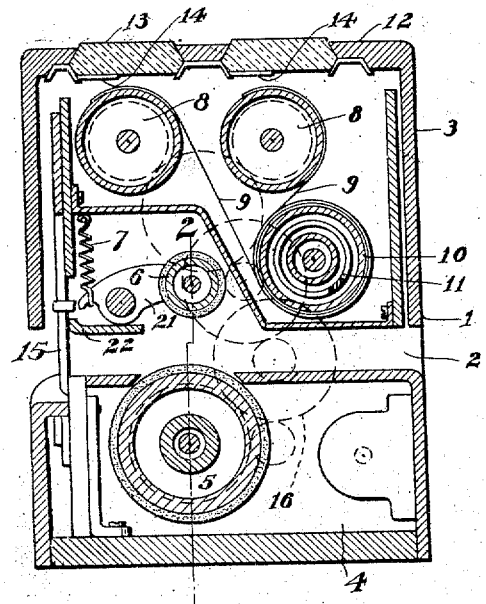

W. E. HOSCH, DEC'D.

A. M. HOSCH, ADMINISTRATRIX.

CLOTH MEASURING MACHINE ROLLER CONSTRUCTION.

APPLICATION FILED NOV. 10, 1920.

Reissued Dec. 21, 1920. 15,012.

Inventor

WALTER E. HOSCH, DECEASED.

ANNIE MAE HOSCH, ADMX.

BY Elliott & Ammen

ATTORNEYS

UNITED STATES PATENT OFFICE.

WALTER E. HOSCH, DECEASED, LATE OF ST. LOUIS, MISSOURI, BY ANNIE MAE HOSCH, ADMINISTRATRIX, OF ST. LOUIS, MISSOURI.

CLOTH-MEASURING-MACHINE-ROLLER CONSTRUCTION.

15,012. Specification of Reissued Letters Patent. Reissued Dec. 21, 1920.

Original No. 1,283,003, dated December 17, 1918, Serial No. 163,364, filed April 30, 1917. Application for reissue filed November 10, 1920. Serial No. 423,170.

*To all whom it may concern:*

Be it known that WALTER E. HOSCH, deceased, who in his lifetime was a citizen of the United States, residing in the city of St. Louis and State of Missouri, did invent new and useful Improvements in Cloth-Measuring-Machine-Roller Construction, of which the following is a specification.

This invention relates to the mounting of rollers. While the invention may be applied to rollers for various purposes, in the following specification, I have described the invention, by way of example, as applied to the rollers of a cloth measuring machine. Such machines are largely used for measuring piece goods sold at retail, and for computing the charge to be made for such goods. In machines of this class, the fabric usually passes between two rollers, and small threads of the fabric and lint tend to accumulate around the bearings of the rollers; indeed they may accumulate to such an extent as to impede the rotation of the rollers. The general object of the invention is to provide a roller construction or mounting, the parts of which are so organized that the roller will present a pocket in which the loose threads and lint may accumulate without exerting any tendency to interfere with the rotation of the roller. In the present instance these pockets are of sufficient size to enable the machine to be used continuously for a great length of time without being cleaned.

Further objects of the invention will appear hereinafter.

Figure 2:
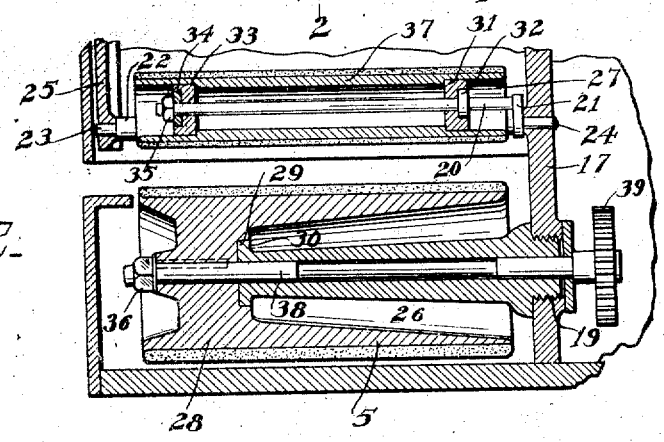

In the drawing which illustrates a preferred embodiment of the invention,

Figure 1 is a vertical cross-section through a measuring machine embodying the improvement, and Fig. 2 is a longitudinal vertical section through the coöperating rollers taken on the line 2—2 of Fig. 1, and upon a large scale.

The invention may be applied to machines of various types, and as an example of the application of the invention I shall now describe it as applied to a measuring machine of a well known type. Such a measuring machine is illustrated in Fig. 1, and comprises a casing 1 which is provided with a throat 2 formed between an upper housing 3 and a lower housing 4. In the lower housing there is mounted a measuring roller 5, the upper face of which projects into the throat or gap 2 in the housing, so as to come into contact with the edge of a piece of goods such as cloth or ribbon which is to be measured.

To coöperate with the measuring roller 5, there is provided a presser roller 6, and this roller is supported so that it can be held at will away from the measuring roller, as illustrated in Fig. 1, or it may be held pressed against the measuring roller by means of a spring 7. Any suitable mechanism may be provided for holding this roller out of contact with the measuring roller.

The measuring machine includes indicating mechanism for indicating the length or selling cost of the piece of goods which is passed between the rollers 5 and 6. In the machine illustrated, two take-up rollers 8 are provided which are mounted in the upper housing 3, and on the face of these rollers webs 9 may be wound, the said webs being normally wound together, that is to say, in the same plane, upon a drum 10. A coiled spring within the drum 10 normally tends to rotate the drum in a direction to wind up the webs 9 upon it.

The upper wall 12 of the case is provided with slots covered by two transparent glass plates 13 which are provided on their under side with scales 14. In using the machine the web of cloth or ribbon that is to be measured is slipped into the throat and between the rollers 5 and 6. The presser roller is then let down and the cloth is then pulled through the rollers. When the desired length of cloth has been drawn between the rollers 5 and 6 its length or cost can be ascertained by looking at the proper point on one or the other of the scales 14. Its edge can then be marked by means of a movable knife 15 which in Fig. 1 is shown in its depressed position. However, when the cloth is being run through, the knife is held above the throat 2 so as to leave the throat unobstructed.

The measuring roller 5 drives a gear train 16 indicated in dotted lines, which in turn drives the two rollers 8 in an anti-clockwise direction. In applying the invention to the pair of rollers such as the rollers 5 and 6, means is provided for supporting each roller from one end only and in such a way that a pocket is formed in the adjacent end of the roller in which loose threads or lint may accumulate. At the other end of the roller there is no support about which the threads could tangle.

The general features of the roller mounting are the same for both rollers. Within the machine, there is provided supporting means preferably in the form of a vertical plate 17. The measuring roller construction and mounting includes an arbor 18, one end of which is secured in the plate 17 by any suitable means such as screw threads 19, and this arbor projects substantially horizontally and coaxially into the measuring roller. The presser roller is also mounted upon an arbor 20 parallel with arbor 18, and this arbor is supported upon an arm 21, said arm being rigidly carried by a horizontal bar 22, the ends of which are provided with trunnions 23 and 24. The trunnion 24 is rotatably mounted in the plate 17 and the other is rotatably mounted in a hanger plate 25. These arbors operate to rotatably support their corresponding rollers, and it will be observed that each roller is supported near its outer end and its outer wall projects toward the support 17 and overhangs the supporting arbor, the outer wall of the roller being out of contact with the arbor. Each arbor is supported solely at one end of the roller and simply projects into its roller, that is to say, it is unsupported at its outer end. The end of the roller 5 which is adjacent to the supporting means 17 is formed with an enlarged pocket 26 which is formed around the arbor 18, and in the roller 6 a pocket 27 is formed in the end adjacent to the supporting means 17. The roller 5 is provided with a transverse head 28 which is preferably disposed remote from the supporting means 17, and toward the outer end of the roller, and the arbor 18 is provided with means against which this head 28 seats. This means is preferably in the form of a collar 29, which is preferably counter-sunk flush into the face of the transverse head 28, so that the inner end or bottom 30 of this pocket 26 presents a substantially smooth surface. With this arrangement it is evident that if any pieces of threads or lint become wrapped around the arbor 18 they can pass into the pocket 26 without interfering in any way with the bearing of the roller, and on account of the construction at the inner end of the pocket, evidently they can not become entangled with the roller even if they pass away into the extreme inner end of the pocket. The pocket 26 is preferably of tapered or conical form. It will be seen that this roller is mounted so that no fixed parts are exposed at the outer end of the roller, that is to say, all the exposed parts at this point rotate with the roller.

In mounting the presser roller 6, a transverse head is provided indicated by 31, near the supporting means 17, and also a collar 32 on the arbor, which collar is countersunk flush into the face of this head. This roller may be provided adjacent its outer end with another transverse head 33 in the outer face of which a washer 34 is counter-sunk where the arbor 20 passes through this head.

The arbors are provided respectively at their outer end with means such as the nut 35 or nut 36, for retaining the roller on its corresponding arbor. The transverse heads 31 and 33 of the presser-roller preferably seat against shoulders formed near the ends of the cylindrical or tubular body 37 of this roller. In order to enable the measuring roller 5 to drive the indicating mechanism, it is provided with a rigidly attached shaft 38 which passes coaxially through the arbor 18 and also through the supporting means 17 so as to receive a gear wheel 39 for driving the gear train 16.

What I claim is:—

1. In a machine of the class described, in combination, fixed supporting means, an arbor projecting from and supported wholly, and at one end only, by said supporting means, and a roller rotatably supported near the outer end of said arbor and having an overhanging wall projecting over said arbor toward said supporting means.

2. In a machine of the class described, a roller construction comprising, in combination, a fixed support, an arbor projecting from and supported solely, and at one end only, by said fixed support, a shaft rotatable in and supported wholly by said arbor with its end projecting from the end of said arbor, and a roller fixed to the projecting end of said shaft whereby all parts exposed on the outer end of said roller are rotatable, said roller extending over said arbor toward said support and forming a pocket about said arbor.

3. In a cloth measuring machine, a measuring roller construction comprising, in combination, a fixed support, a measuring roller having an end adjacent said fixed support, an arbor supported at one end by said support, and projecting from said fixed support into said roller to support the same, means exposed on the outer end of said roller for attaching the same, said means being rotatable with said roller, and a pocket formed in the end of said roller and around said arbor, in which lint and threads may accumulate.

4. In a machine of the class described, in combination, fixed supporting means, an arbor projecting from and supported wholly at one end only, by said supporting means, and a roller rotatably supported near the outer end of said arbor, at a point remote from said supporting means, the outer wall of said roller overhanging said arbor and projecting over said arbor toward said supporting means and out of contact with said arbor.

5. In a cloth-measuring machine, in combination, fixed supporting means, a measuring roller having an end adjacent said supporting means, a presser roller to cooperate with said measuring-roller and having an end adjacent said supporting means, an arbor corresponding to each roller, supported at one end only by said supporting means, and projecting from said supporting means into each of said rollers to support the same, each of said rollers having a pocket formed in its end adjacent said supporting means and around its corresponding arbor, in which lint and threads may accumulate.

6. In a cloth-measuring machine, in combination, fixed supporting means, a measuring roller having an end adjacent said supporting means, a presser roller to cooperate with said measuring roller and having an end adjacent said supporting means, each of said rollers having a transverse head therein, an arbor corresponding to each roller projecting from said supporting means into each of said rollers to support the same, and having a collar counter-sunk and fitting into the said head of each of said rollers, to exclude lint, each of said rollers having a pocket formed in its end adjacent said transverse head and around its corresponding arbor, in which lint and threads may accumulate.

7. In a cloth measuring machine, in combination, fixed supporting means, a measuring roller having an end adjacent said supporting means, an arbor attached to said supporting means and projecting into said measuring roller, a shaft carrying said measuring roller and extending through said arbor and said supporting means to drive the indicating means of said measuring machine, a presser roller to coöperate with said measuring roller by pressing the cloth against the same, another arbor movably supported in said supporting means and projecting into said presser roller, said rollers each having a pocket formed in its end adjacent said supporting means in which lint and threads may accumulate.

8. In a cloth measuring machine, in combination, fixed supporting means, a measuring roller having an end adjacent said supporting means, an arbor secured at one end only to said supporting means and projecting into said measuring roller, a shaft carrying said measuring roller and having means for driving the mechanism of said machine, a presser roller to coöperate with said measuring roller and having an end adjacent said supporting means, a second arbor movably mounted in, and supported at one end only in said supporting means and projecting into said presser roller, each of said rollers having a transverse head therein and each of said arbors having a transverse collar, the transverse head of its corresponding roller having a counterbore fitting the collar to exclude lint.

9. In a cloth measuring machine, in combination, fixed supporting means, a measuring roller having an end adjacent said supporting means, an arbor secured at one end only to said supporting means and projecting into said measuring roller, a shaft carrying said measuring roller and having means for driving the mechanism of said machine, a presser roller to coöperate with said measuring roller and having an end adjacent said supporting means, an arbor movably mounted on said supporting means supported at one end only by said supporting means, and projecting into said presser roller, each of said rollers having a transverse head therein, and each of said arbors having a collar, its corresponding head, having a counterbore fitting the collar to exclude lint, and means disposed adjacent the ends of said arbors respectively for retaining the rollers thereupon.

10. In a cloth measuring machine, a presser roller construction comprising fixed supporting means, a presser roller having one end disposed adjacent said supporting means, an arbor movably mounted in said supporting means and projecting longitudinally along the axis of said presser roller, a transverse head in said presser roller adjacent said supporting means, a collar on said arbor counter-sunk into said head, a second transverse head in said roller disposed toward the other end thereof, and means on the end of said arbor for engaging said last named head to retain said presser roller.

11. In a cloth measuring machine, a presser roller construction comprising fixed supporting means, a presser roller having one end disposed adjacent said supporting means, and having a pocket formed in each end thereof, an arbor movably mounted in said supporting means and projecting longitudinally along the axis of said presser roller, a transverse head in said presser roller adjacent said supporting means, a collar on said arbor of considerably less diameter than said pocket, countersunk into said head, with its outer face substantially flush with the outer face of the head, a second transverse head in said roller disposed toward the other end thereof, and means on the end of said arbor for engaging said last named head to retain said presser roller, said collar leaving the adjacent pocket unobstructed from the end of the roller to the first named head.

12. In a cloth measuring machine, the combination of a roller for engaging the cloth to be measured, having a body with a pocket in the end thereof, and having a transverse head forming the bottom for said pocket, and a member for rotatably supporting said roller, having a fixed collar countersunk into said head with the outer face of the collar flush with the outer face of the head, said collar being of considerably smaller diameter than the diameter of the pocket.

ANNIE MAE HOSCH,
*Administratrix of Walter E. Hosch, deceased.*